(12) United States Patent
Chen

(10) Patent No.: US 6,386,644 B2
(45) Date of Patent: May 14, 2002

(54) BICYCLE HUB PROVIDED WITH A SEAL MEMBER FOR PREVENTING ENTRANCE OF DUST

(75) Inventor: Hubert Chen, Taichung Hsien (TW)

(73) Assignee: Kun Teng Industry Co., Ltd., Taichung Hsien (TW)

(*) Notice: Subject to any disclaimer, the term of this patent is extended or adjusted under 35 U.S.C. 154(b) by 0 days.

(21) Appl. No.: 09/765,875

(22) Filed: Jan. 19, 2001

Related U.S. Application Data

(63) Continuation-in-part of application No. 09/634,442, filed on Aug. 8, 2000, now Pat. No. 6,322,155.

(51) Int. Cl.[7] .......................... B60B 27/00; F16D 41/30
(52) U.S. Cl. ...................... 301/110.5; 192/64; 384/484; 277/529
(58) Field of Search .......................... 301/110.5, 110.6, 301/59; 192/64; 384/484; 277/381, 529, 530

(56) References Cited

U.S. PATENT DOCUMENTS

| | | | | |
|---|---|---|---|---|
| 4,567,973 A | * | 2/1986 | Butz | 192/64 |
| 5,370,404 A | * | 12/1994 | Klein et al. | 277/381 |
| 5,632,364 A | * | 5/1997 | Mercat | 192/64 |
| 5,642,796 A | * | 7/1997 | Tabe | 192/64 |
| 6,062,734 A | * | 5/2000 | Bundgart | 384/477 |
| 6,202,813 B1 | * | 3/2001 | Yahata et al. | 192/64 |

\* cited by examiner

Primary Examiner—Russell D. Stormer
(74) Attorney, Agent, or Firm—Ohlandt, Greeley, Ruggiero & Perle, L.L.P.

(57) ABSTRACT

A hub includes a hub housing sleeved rotatably on a spindle, and a tubular end piece sleeved fixedly on the spindle. A tubular flexible seal member is disposed between the hub housing and the end piece, and includes an outer ring and an inner ring. The outer ring has a circular tubular portion with an axial inner end, and an inward flange that extends integrally, radially and inwardly from the inner end of the circular tubular portion to abut against a bottom wall of an annular groove that is formed in an end surface of the hub housing. The inner ring has a largest-diameter inner end that is formed integrally with an inner periphery of the inward flange, and a smallest-diameter outer end portion which is sleeved around and which is in tight engagement with a frictional outer surface of an insert portion of the end piece. The inner ring reduces gradually in inner diameter from the largest-diameter inner end to the smallest-diameter outer end portion. The smallest-diameter outer end portion has an inner diameter that is slightly smaller than outer diameter of the insert portion of the end piece when removed from the end piece.

5 Claims, 4 Drawing Sheets

BICYCLE HUB PROVIDED WITH A SEAL MEMBER FOR PREVENTING ENTRANCE OF DUST

CROSS-REFERENCE OF RELATED APPLICATION

This application is a Continuation-in-Part application of U.S. patent application Ser. No. 09/634,442, which was filed on Aug. 8, 2000 and now U.S. Pat. No. 6,322,155.

BACKGROUND OF THE INVENTION

1. Field of the Invention

The present invention relates to a bicycle hub, more particularly to a bicycle hub that is provided with a seal member for preventing entrance of dust.

2. Description of the Related Art

Referring to FIG. 1, a conventional bicycle hub is shown to include a spindle 2 and a hub housing 1 mounted rotatably around the spindle 2 in such a manner that right and left spindle portions of the spindle 2 project outwardly from left and right end portions of the hub housing 1. The housing 1 has an annular groove 101 that is formed in the left end portion thereof and that is defined by a side wall 1012 and a bottom wall 1011. A sprocket mounting member 3 is sleeved around the left spindle portion of the spindle 2 adjacent to the left end portion of the hub housing 1. The sprocket-mounting member 3 includes an inner shell 302 which extends into and which is coupled securely with the left end portion of the hub housing 1, and an outer shell 301 which is rotatably mounted on the inner. shell 302 and which is formed with a circumferential groove 307. A ratchet mechanism is disposed within the outer shell 301, and is operably coupled with the inner shell 302 so as to permit synchronous rotation of the outer shell 301 with the hub housing 1 only in a forward direction.

A seal member 4 is disposed between the sprocket-mounting member 3 and the hub housing 1, and includes a circular tubular portion 401 that has an inner surface 4011 and that is disposed within the circumferential groove 307 of the outer shell 301, and an outward flange 402 which has a proximate inner end 4021 integrally formed with the tubular portion 401 and a distal outer end 4022 abutting against the side wall 1012 of the annular groove 101 in the hub housing 1, thereby preventing dirt or dust from entering into the sprocket-mounting member 3 and the hub housing 1.

Referring to FIG. 2, another conventional bicycle hub is shown to include a hub housing 5 mounted rotatably around a spindle 6, and a bearing retention cap 7 which is disposed within the left end portion 501 of the hub housing 5 around the left spindle portion thereof to prevent removal of a bearing unit from the hub housing 1. The bearing retention cap 7 has an outer surface 701 that is formed with an annular groove 7011. A seal member 8 includes a tubular portion 801 with an axial inner end 8011 disposed within the annular groove 7011 in the cap 7, and an outward flange 802 that extends radially and outwardly from the axial inner end 8011 and that abuts against an inner surface of the hub housing 5 so as to prevent dirt or dust from getting into an interior of the hub housing 5.

Note that in the aforesaid conventional bicycle hubs, the seal members 4, 8 are disposed fixedly on the sprocket-mounting member 3 and the bearing retention cap 7, respectively, and have portions slidably engaged with the inner surfaces of the hub housings 1, 5. As such, frictional force generated from the hub housings 1, 5 is relatively high due to the fact that the hub housings 1, 5 have a relatively large inner diameter that results in an increase in the interengaging surface area between the seal members 4,8 and the elements 3, 7.

SUMMARY OF THE INVENTION

Therefore, the object of this invention is to provide a bicycle hub which includes a flexible seal member of a specific configuration so as to be able to reduce frictional force generated due to rotation a hub housing relative to a spindle that is disposed within the hub housing.

Accordingly, a bicycle hub of the present invention includes a spindle, a tubular hub housing, at least one tubular end piece, and a tubular seal member. The hub housing is sleeved rotatably on the spindle. The end piece is sleeved fixedly on the spindle near an end of the hub housing. The seal member is disposed between the hub housing and the end piece. The hub housing has an end surface which is formed with an annular groove that is defined by a side wall and a bottom wall. The end piece has a tubular insert portion with an annular frictional outer surface, around which the side wall of the hub housing is disposed. The seal member is disposed within the hub housing, and includes an L-shaped cross-sectioned flexible outer ring, and a generally truncated conical inner ring. The outer ring has a circular tubular portion with an axial inner end, and an inward flange that extends integrally, radially and inwardly from the axial inner end of the circular tubular portion and that abuts against the bottom wall of the hub housing. The inner ring has a largest-diameter inner end that is formed integrally with an inner periphery of the inward flange of the outer ring, and a smallest-diameter outer end portion which is sleeved around and which is in tight engagement with the frictional outer surface of the end piece. The inner ring reduces gradually in inner diameter from the largest-diameter inner end to the smallest-diameter outer end portion. The smallest-diameter outer end portion has an inner diameter that is slightly smaller than the outer diameter of the insert portion of the end piece when removed from the end piece.

Accordingly, the seal member is fixed relative to the hub housing and is slidable relative to the end piece. During rotation of the hub housing relative to the spindle, because the outer diameter of the end piece is relatively small, friction force between the seal member and the end piece is thus reduced.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
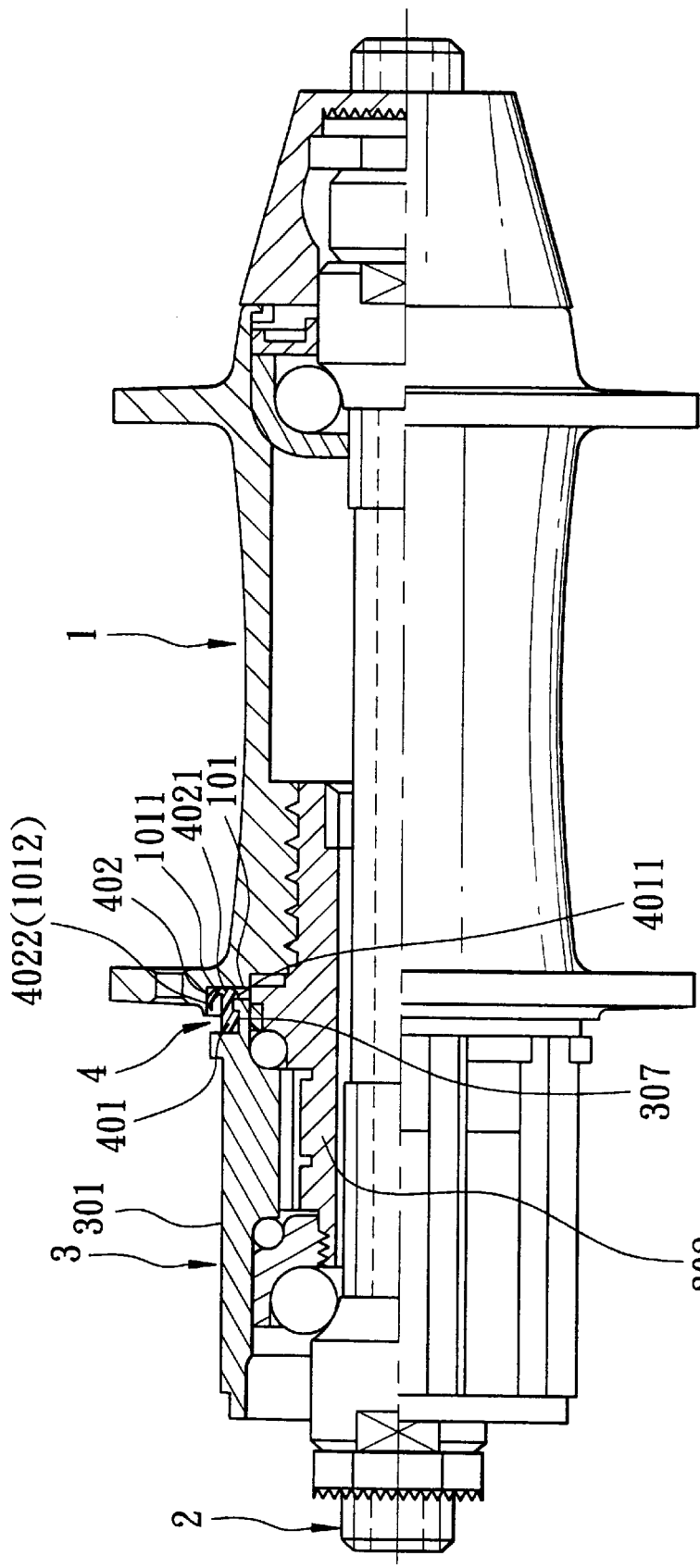
FIG. 1 is a schematic partly sectional view of a conventional bicycle hub, illustrating how a flexible seal member is mounted therein.
Figure 2:
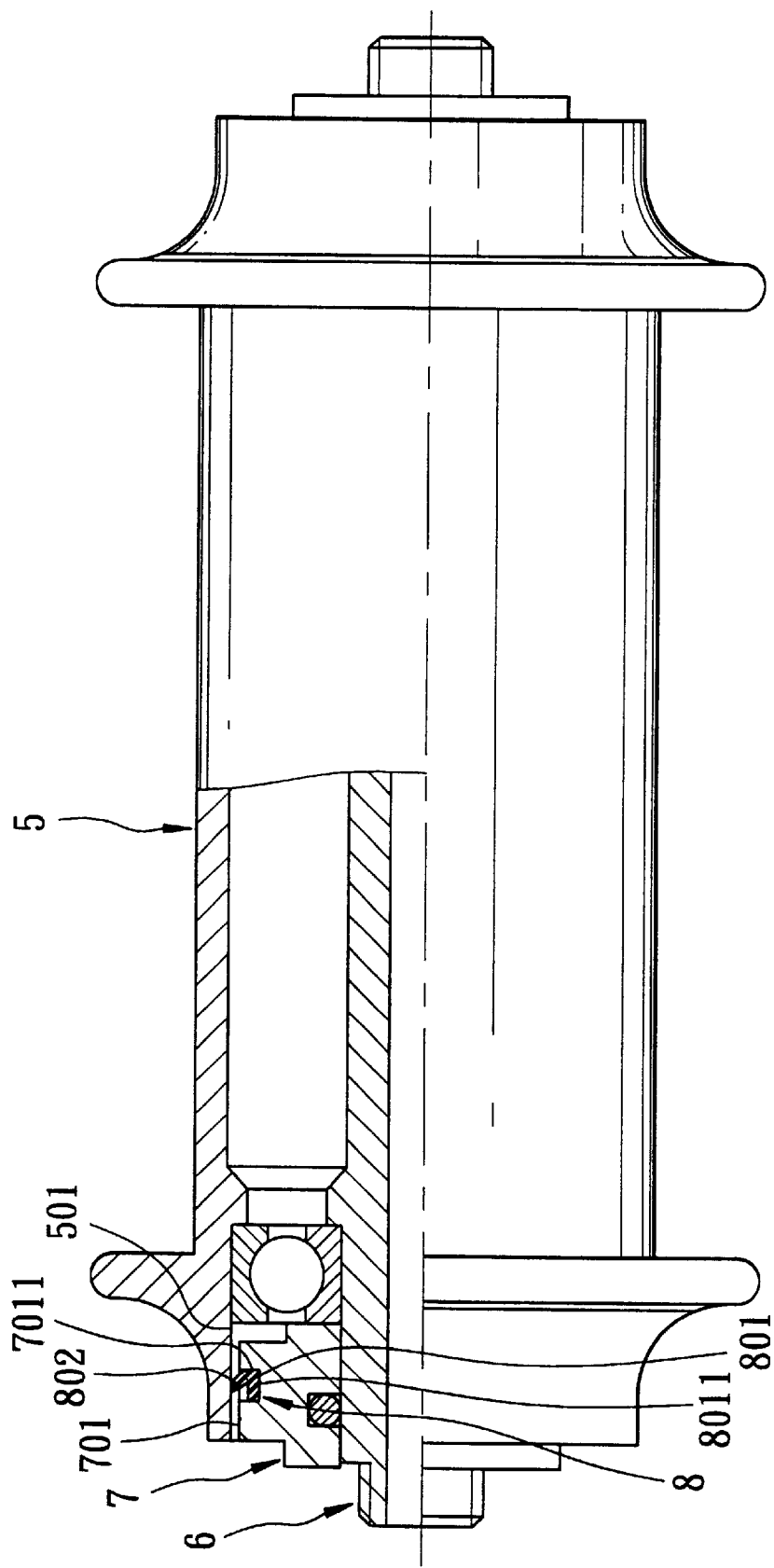
FIG. 2 is a schematic partly sectional view of another conventional bicycle hub, illustrating how a flexible seal member is mounted therein.
Figure 3:
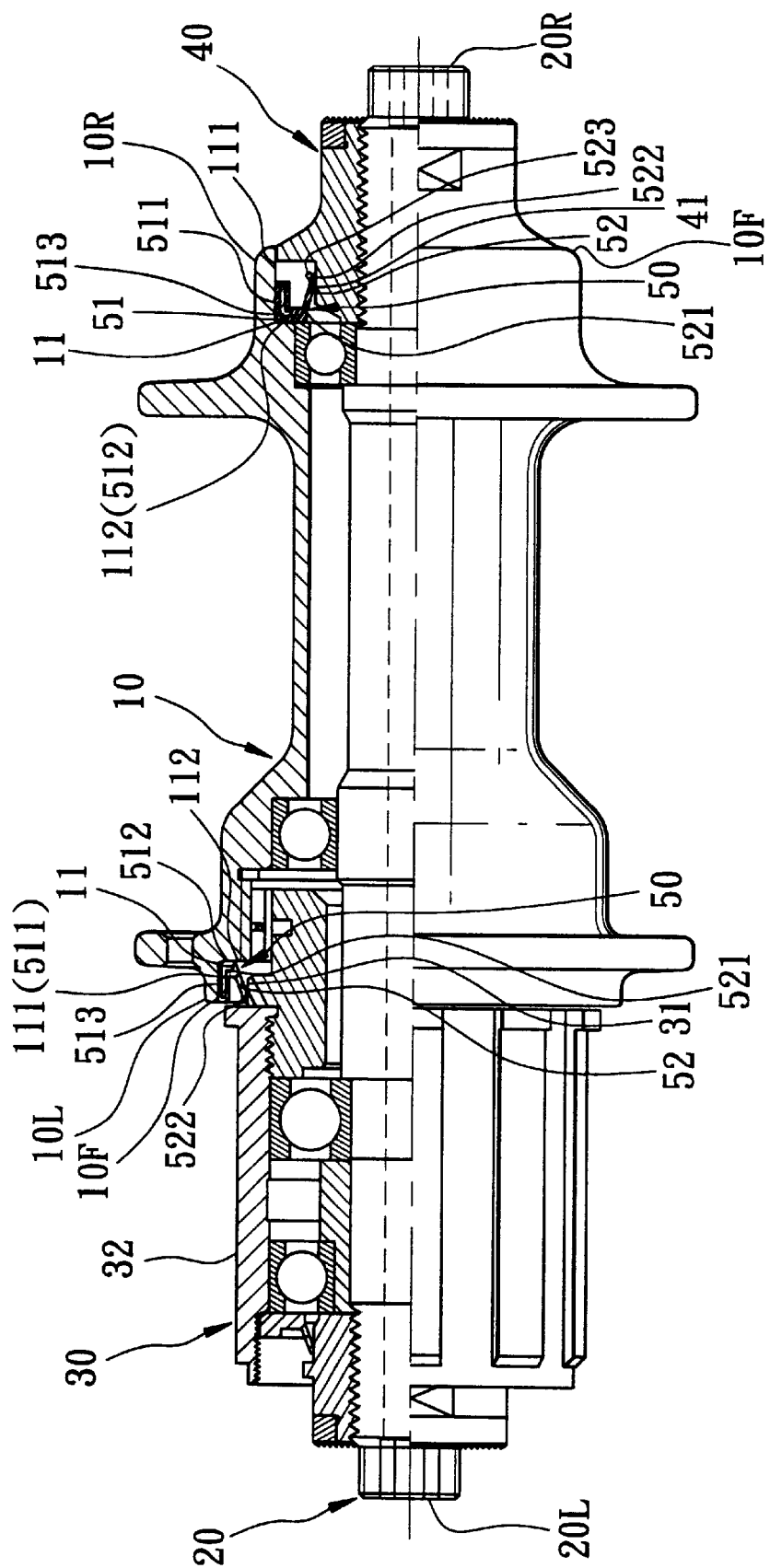
FIG. 3 is a schematic partly sectional view of the preferred embodiment of a bicycle hub according to the present invention, illustrating how two flexible seal members are mounted on opposite sides of a hub housing.
Figure 4:
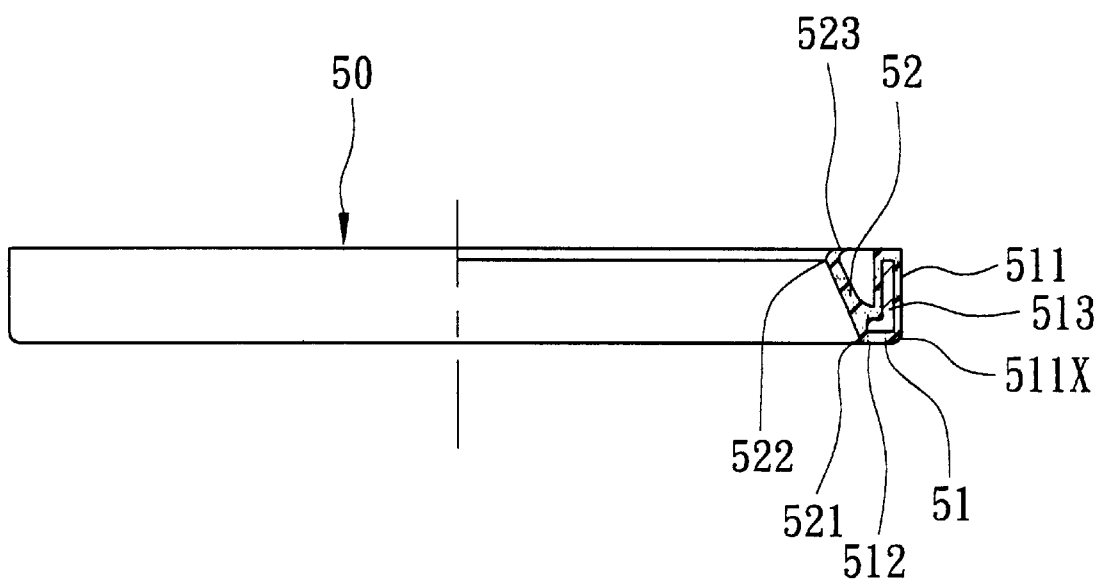
FIG. 4 is an enlarged sectional view of the seal member employed in the preferred embodiment.

Referring to FIGS. 3 and 4, the preferred embodiment of a bicycle hub of the present invention is shown to include a spindle 20 with left and right portions 20L, 20R, a tubular hub housing 10, a left tubular end piece that is shaped as a sprocket-mounting member 30, a right tubular end piece 40 that is shaped as a bearing retention member, and two seal members 50.

As illustrated, the hub housing 10 is rotatably mounted on the spindle 20 in such a manner that the left and right spindle portions 20L, 20R of the spindle 20 respectively project outwardly from the left and right end portions 10L, 10R of the hub housing 10. The hub housing 10 has left and right end surfaces 10F, each of which is formed with an annular groove 11 that is defined by a side wall 111 and a bottom wall 112.

The bearing retention member 40 is sleeved fixedly on the right spindle portion 20R of the spindle 20, and has a tubular insert portion 41 with an annular frictional outer surface, around which the side wall 111 of the hub housing 10 is disposed.

The right seal member 50 is disposed within the right end portion 10R of the hub housing 10 and the bearing retention member 40, and includes an L-shaped cross-sectioned flexible outer ring 51, and a generally truncated conical inner ring 52. The outer ring 51 has a circular tubular portion 511 with an axial inner end (511X), and an inward flange 512 that extends integrally, radially and inwardly from the axial inner end (511X) of the circular tubular portion 511 and that abuts against the bottom wall 112 of the hub housing 10. The inner ring 52 has a largest-diameter inner end 521 that is formed integrally with an inner periphery of the inward flange 512 of the outer ring 51, and a smallest-diameter outer end portion 522 which is sleeved around and which is in tight engagement with the frictional outer surface of the insert portion 41 of the bearing retention member 40. The inner ring 52 reduces gradually in inner diameter from the largest-diameter inner end 521 to the smallest-diameter outer end portion 522. The smallest-diameter outer end portion 522 has an inner diameter that is slightly smaller than the outer diameter of the insert portion 41 of the bearing retention member 401 when removed from the bearing retention 40. In this preferred embodiment, the bearing retention member 40 is mounted threadedly on the right spindle portion 20R of the spindle 20 to prevent disengagement of a bearing unit that is disposed within the hub housing 10 inboard to the bearing retention member 40.

The inner ring 52 of the seal member 50 further has an outer distal end 523, which has an inner diameter that is slightly larger than the outer diameter of the insert portion 41 of the bearing retention member 40. The inner diameter of the inner ring 52 increases gradually from the smallest-diameter outer end portion 522 to the outer distal end 523, thereby facilitating insertion of the insert portion 41 of the bearing retention member 40 into the smallest-diameter outer end portion 522 of the inner ring 52 of the seal member 50 during assembly of the bearing retention member 40 and the seal member 50.

Preferably, an L-shaped-cross-sectioned metal ring 513 is embedded within the outer ring 51 of the seal member 50 so as to reinforce rigidity of the same.

The sprocket-mounting member 30 is sleeved around the left spindle portion 20L of the spindle 20, and includes an outer shell 32 upon which a sprocket (not shown) can be mounted, and an inner shell 31 that extends into the left end portion 10L of the hub housing 10 and that is coupled securely with the spindle 20. A ratchet unit (not visible) can be disposed within the outer shell 32 of the sprocket-mounting member 30 in such a manner to permit synchronous rotation of the outer shell 32 with the hub housing 10 only in a forward direction. Since the structure of the ratchet unit is not pertinent to the present invention, a detailed description of the same is omitted herein for the sake of brevity. In this preferred embodiment, the left seal member 50 is disposed within the left end portion 10L of the hub housing 10 and the inner shell 31. The connection relationship between the inner shell 31 and the left seal member 50 is the same as that between the right seal member 50 and the bearing retention member 40.

In this preferred embodiment, because the outer ring 51 of the seal member 50 is fixed to the hub housing 10, the frictional force attributed to the inner ring 52 acts on the end piece 30, 40. Since the diameters of the end pieces 30, 40 are much smaller than that of the hub housing 10, the frictional force that results during rotation of the hub housing 10 relative to the end pieces 30, 40 is smaller than that of the conventional hubs, in which the seal member is securely mounted to an end piece instead of the hub housing. The object of the present invention is thus achieved.

With this invention thus explained, it is apparent that numerous modifications and variations can be made without departing from the scope and spirit of this invention. It is therefore intended that the invention be limited only as indicated in the appended claims.

I claim:

1. A hub including a spindle, a tubular hub housing sleeved rotatably on said spindle, a tubular end piece sleeved fixedly on said spindle near an end of said hub housing, and a tubular seal member disposed between said hub housing and said end piece, wherein the improvement comprises:

said hub housing having an end surface which is formed with an annular groove that is defined by a side wall and a bottom wall;

said end piece having a tubular insert portion with an annular frictional outer surface, around which said side wall of said hub housing is disposed; and said seal member being disposed within said hub housing and including:

an L-shaped cross-sectioned flexible outer ring having a circular tubular portion with an axial inner end, and an inward flange extending integrally, radially and inwardly from said axial inner end of said circular tubular portion and abutting against said bottom wall of said hub housing, and a generally truncated conical inner ring having a largest-diameter inner end that is formed integrally with an inner periphery of said inward flange of said outer ring, and a smallest-diameter outer end portion which is sleeved around and which is in tight engagement with said frictional outer surface of said end piece, said inner ring reducing gradually in inner diameter from said largest-diameter inner end to said smallest-diameter outer end portion, said smallest-diameter outer end portion having an inner diameter that is slightly smaller than outer diameter of said insert portion of said end piece when removed from said end piece.

2. The hub as defined in claim 1, wherein said end piece is shaped as a sprocket-mounting member, which is adapted to permit sleeving of a sprocket thereon.

3. The hub as defined in claim 1, wherein said end piece is shaped as a bearing retention cap.

4. The hub as defined in claim 1, wherein said inner ring of said seal member further has an outer distal end, which has an inner diameter that is slightly larger than the outer diameter of said insert portion of said end piece, said inner ring having an inner diameter that increases gradually from said smallest-diameter outer end portion to said outer distal end, thereby facilitating insertion of said insert portion of said end piece into said smallest-diameter outer end portion of said inner ring of said seal member during assembly of said end piece and said seal member.

5. The hub as defined in claim 1, wherein said seal member further includes an L-shaped-cross-sectioned metal ring that is embedded within said outer ring of said member.

* * * * *